United States Patent
Botero

(10) Patent No.: US 11,847,477 B1
(45) Date of Patent: Dec. 19, 2023

(54) TECHNIQUES FOR NATIVELY INTERPRETING LOGIC ACROSS DISPARATE PLATFORMS

(71) Applicant: Amazon Technologies, Inc., Seattle, WA (US)

(72) Inventor: Luis Jaime Botero, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 182 days.

(21) Appl. No.: 17/202,747

(22) Filed: Mar. 16, 2021

(51) Int. Cl.
  G06F 9/455 (2018.01)
  G06F 9/30 (2018.01)

(52) U.S. Cl.
  CPC ...... *G06F 9/45516* (2013.01); *G06F 9/30072* (2013.01); *G06F 9/30094* (2013.01); *G06F 9/45508* (2013.01)

(58) Field of Classification Search
  CPC ............. G06F 9/45516; G06F 9/30072; G06F 9/30094; G06F 9/45508
  USPC ....................................................... 717/148
  See application file for complete search history.

(56) References Cited

U.S. PATENT DOCUMENTS

| | | | | |
|---|---|---|---|---|
| 7,627,852 B1* | 12/2009 | Stroomer | ................ | G06F 9/547 717/114 |
| 8,181,035 B1* | 5/2012 | Fernandez Gutierrez | ................... | H04L 9/14 713/176 |
| 2007/0038550 A1* | 2/2007 | Caille | ................... | G06Q 40/04 705/37 |
| 2009/0244071 A1* | 10/2009 | Kuo | ........................ | G06T 13/40 704/E21.001 |
| 2010/0153326 A1* | 6/2010 | Bernardes | ........... | H04L 41/0893 706/47 |
| 2014/0020068 A1* | 1/2014 | Desai | ................. | G06Q 20/3227 726/4 |
| 2015/0100943 A1* | 4/2015 | Gabel | ..................... | G06F 40/20 717/106 |
| 2015/0286737 A1* | 10/2015 | Cattone | ............... | G06F 3/04842 715/234 |
| 2016/0314296 A1* | 10/2016 | Attfield | ............... | G06F 9/30094 |
| 2019/0146772 A1* | 5/2019 | Griffin | ...................... | G06F 8/71 717/121 |
| 2020/0348964 A1* | 11/2020 | Anand | .................. | G06F 9/5005 |
| 2021/0255842 A1* | 8/2021 | Levitt | ....................... | G06F 8/71 |

* cited by examiner

*Primary Examiner* — Chat C Do
*Assistant Examiner* — Bradford F Wheaton
(74) *Attorney, Agent, or Firm* — Kilpatrick Townsend & Stockton LLP

(57) ABSTRACT

Systems and methods are provided herein for natively interpreting logic across disparate platforms. Rather than executing server calls that are computationally expensive, logic may be extracted into code segments that can be evaluated at run time by an interpreter. The interpreter is passed a set of evaluators, features, and contextual data, each of which is expressed in a domain specific language. An evaluator maps an identifier to a rule and describes one or more contextual data fields with which the rule is to be evaluated. A feature corresponds to a logical condition that identifies the evaluator and a return value that is returned if the condition is met. The interpreter identifies the evaluator from the feature being evaluated and evaluates its corresponding rule based on the contextual data provided to return a return value. One or more operations may be performed based on the return value provided.

18 Claims, 10 Drawing Sheets

```
define (getButtonColor struct::ctx string::buttonColor)
( and
    (. ctx."countryCode" countryCode)
    (. ctx "pageType" pageType)
    (first
        (and
            (= country Code "US")      ⎫
            (= pageType "detail")       ⎬ 210
            (= buttonColor "Blue")     ⎭
        )
        (and
            (= country Code "CN")      ⎫
            (= pageType "detail")       ⎬ 216
            (= buttonColor "Red")      ⎭
        )
        (= buttonColor "Green")   ← 222
    )
)
```
202

```
String getButtonColor(|context ctx)
{
    if(ctx.countryCode == "US" && ctx.pageType == "detail")  ⎫
    {                                                          ⎬ 212
        return "Blue";                                         ⎭
    }
    else if (ctx.countryCode == "CN" && ctx.pageType == "detail")  ⎫
    {                                                                ⎬ 218
        return "Red";                                                ⎭
    }
    else                          ⎫
    {                             ⎬ 224
        return "Green";           ⎭
    }
}
```
204

```
feature_id: "ButtonColor",
fallback_value: "Green",   ← 220
options: [
    {
        when_all: [                              ⎫
            { in: ["countryCode", "US"] },       ⎬ 208
            { is: ["pageType", "detail"] }       ⎭
        ],
        return_value: "Blue",
    },
    {
        when_all: [                              ⎫
            { in: ["countryCode", "CN"] },       ⎬ 214
            { is: ["pageType", "detail"] }       ⎭
        ],
        return_value: "Red",
    }
]
```
206

```
(define (interpreter::evaluators struct:: evaluators)
(= evaluators
   [
      {
         evaluator_name: "countryCode",
         evaluator_implementation: "interpreter.evaluators.caseInsensitiveStringEqualEvaluator",   ⎫
         evaluator_uses_context_key: "contextCountryCode"                                          ⎬ 502
      },                                                                                          ⎭
      {
         evaluator_name: "isTypeAUser",
         evaluator_implementation: "interpreter.evaluators.equalEvaluator",                        ⎫ 504
         evaluator_uses_context_key: "typeUser"                                                    ⎬
      },                                                                                          ⎭
      {
         evaluator_name: "dependentOnFeature",
         evaluator_implementation: "interpreter.evaluators.dependentOnFeatureEvaluator",           ⎬ 506
      },
      {
         evaluator_name: "overrideCode",
         evaluator_implementation: "interpreter.evaluators.overrideEvaluator",                     ⎫ 508
         evaluator_uses_context_key: "overrideCode"                                                ⎬
      },                                                                                          ⎭
```

FIG. 5

```
(exist (featureSet evaluatorsSet scenario scenarios)    ← 702
  (and
      (interpreter::evaluators evaluators)    ← 704
      (interpreter::features features)    ← 706
      (= scenarios [
          {
              test_name: "Happy Path Button Color US",
              feature_id: "buttonColor"
              expected_value: "Blue",
              contextData: [
                  contextCountryCode: "US",
                  isTypeAUser: true,
              }
          },
          {
              test_name: "Happy Path Background Color US",
              feature_id: "backgroundColor"
              expected_value: "Gray",
              contextData: [
                  contextCountryCode: "US",
                  isTypeAUser: true,
              }
          },
          {
              test_name: "Happy Path Button Color CN",
              feature_id: "buttonColor"
              expected_value: "Red",
              contextData: [
                  contextCountryCode: "CN",
                  isTypeAUser: true,
              }
          },
          {
              test_name: "Happy Path Background Color CN",
              feature_id: "backgroundColor"
              expected_value: "White",
              contextData: [
                  contextCountryCode: "US",
                  isTypeAUser: true,
              }
          },
716 →     (interpreter::featureTester evaluators features scenarios failedTests)
  )
)
```

- 708 (first scenario block)
- 710 (second scenario block)
- 712 (third scenario block)
- 714 (fourth scenario block)

TECHNIQUES FOR NATIVELY INTERPRETING LOGIC ACROSS DISPARATE PLATFORMS

BACKGROUND

Online service providers may choose to provide services across disparate platforms. By way of example, a service provider may provide one platform in one country, and another platform in a different country. While the platforms may share similar functionality and/or logic, specific features of each platform may differ. Additionally, these platforms may be written in different programming languages making implementations in one platform unusable to the other. When the service provider wants to change logic that is spread across these platforms, the change requires platform-specific changes to be made to each platform, which is time consuming, computationally expensive, and requires personnel that are knowledgeable in the programming language of the given platform. Conventionally, when changes are made to the underlying logic of a platform, the corresponding code is recompiled and redeployed which further decreases the availability of the change. Embodiments of the invention discussed herein address these and other problems, individually and collectively.

BRIEF DESCRIPTION OF THE DRAWINGS

Various embodiments in accordance with the present disclosure will be described with reference to the drawings, in which:

FIG. 2 illustrates a number of example code segments utilized to express domain logic, in accordance with at least one embodiment;

FIG. 5 illustrates an exemplary set of evaluators, in accordance with at least one embodiment;

FIG. 7 illustrates components of an example unit test, in accordance with at least one embodiment;

DETAILED DESCRIPTION

Figure 1:
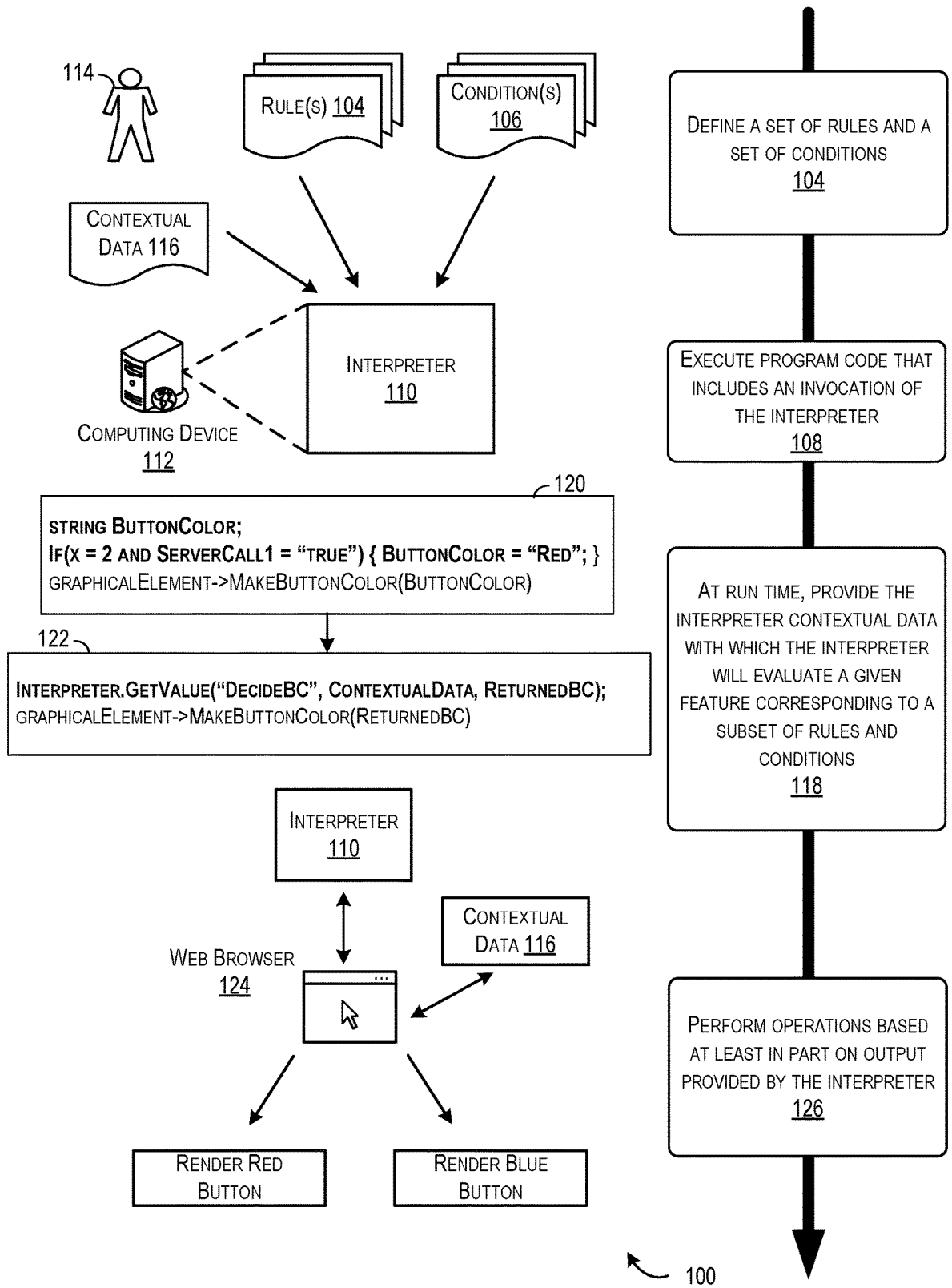
FIG. 1 is a flow diagram for utilizing an interpreter to evaluate logic at run time of a software program, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Techniques described herein are directed to providing domain logic via interpretable code. In some examples, a service provider computer (e.g., a server) may host electronic content via one or more software platforms which can be implemented using different programming languages (e.g., Java, Javascript, C++, etc.). The domain logic (also referred to herein as "conditional logic") of such software platforms can be used to determine how data is created, stored, and changed. "Domain logic," as used herein, refers the logic behind a determination by a software program to perform a set of operations and the reasons behind why that determination was made. In one platform, (e.g., an online retail website in domain A), domain logic may specify a set of conditions and/or data with which aspects of a user interface (e.g., a color of an graphical interface element such as a button, box, text, or any suitable portion of a graphical interface) may be determined. In another platform, (e.g., a corresponding online retail website in domain B) separate domain logic may be utilized to specify conditions and/or data within which aspects of the user interface are determined. Each version of the domain logic may be expressed in different programming languages (e.g., Java in domain A, JavaScript in domain B, etc.). When a service provider (e.g., an online retailer) wishes to make a change (e.g., a change to the user interface in this example), updates to each version of the domain logic are required. This can be time consuming and burdensome for the service provider to implement.

The techniques disclosed in at least one embodiment herein provide for encapsulating domain logic (e.g., conditional logic such as if, else, while, for statements, etc.) that was previously embedded in program code in a format that is configured to be interpretable by an interpreter. An "interpreter" is a computer program that directly executes instructions written in a programming or scripting language, without requiring them to have been previously compiled into a machine language program. The program code may no longer be configured to determine whether or not to perform a set of operations, nor evaluate the conditions of that determination. Rather, the program code may be configured to react to the return values provided by the interpreter. Said another way, whereas the program code one decided, based on a set of conditions, whether to make a graphical element red or blue, the logic behind that determination may now be evaluated by the interpreter, and the program code may be configured to make the graphical element whatever color the interpreter indicates. In some embodiments, the interpreter may be specific to a given programming language. In some examples, the interpreter may be one of many maintained by the system. The embedded logic for both platforms can be expressed within a "feature" (e.g., a feature directed to determining the color of an interface object such as a button). The feature may define conditions and return values corresponding one or more domains. At least one condition may be expressed using an evaluator. Each evaluator corresponds to a mapping between an evaluator identifier and one or more predefined rules. In some embodiments, contextual data identifying various parameters of the run time environment and/or the user may be obtained and utilized to evaluate the conditions of the feature.

By way of example, evaluating the conditions (e.g., conditional logic) provided for a feature may cause the interpreter to identify the color to be used for an interface element (e.g., a button) as one color (e.g., red) when provided contextual data corresponding to domain A, and a different color (e.g., blue) when provided contextual data corresponding to domain B. Each version of the domain code may be modified to remove the logic that can instead be provided by a set of predefined features and evaluators. Rather than execute a corresponding version of program code in each domain, the domain code may invoke a corresponding interpreter to evaluate the feature at run time. By way of example, an invocation of an interpreter may pass any suitable parameter(s) identifying a set of predefined features, a set of predefined evaluators, contextual data corresponding to the run time environment, a particular feature to be evaluated, and an identifier corresponding to the return value to be provided or any suitable combination of the above. Any suitable operation (e.g., setting the color of a button to be presented at a user device to a color corresponding to the return value) may be performed in response to receiving output (e.g., a return value) from the interpreter.

The techniques discussed herein may be used in an incremental fashion. For example, perhaps a developer is in the early stages of developing a webpage. At first, the developer has perhaps only implemented the ability for a graphical element (e.g., a button) to be presented in the color red. The developer may specify a return value of "red" is to be returned when the interpreter is invoked to evaluate a particular feature at run time. The program code may be configured to call the interpreter, and at first, the interpreter may only return red when evaluating that particular feature. Subsequently, the developer may implement functionality to allow the button to be presented in blue and green, in addition to red. The conditions and code for determining what color to make the button (e.g., blue, green, or red) may now be added to the feature to be evaluated by the interpreter. However, the program code need not change. It may still simply present the button in whatever color is identified and returned by the interpreter. In this manner, these types of changes (e.g., the particular conditions, or reasons why a particular determination is made) may be made at run time by changing the logic within the feature to be evaluated by the interpreter without having to modify or recompile the program code.

By utilizing the techniques disclosed herein, the domain logic for multiple domains may be collocated, making changes to such logic easier to perform than conventional systems that required separate modifications to program code of the various domains. Additionally, because the domain logic is provided via interpretable statements, the logic may be modified and utilized without having to recompile program code. In some embodiments, any suitable combination of the features, the evaluators, and/or the contextual data may be expressed using a domain specific language (DSL). A "domain specific language" may refer to a computer language that is optimized/directed to a particular application domain. As a non-limiting example, the DSL discussed herein may be specific to defining domain logic and the corresponding rules and/or operations performed as part of evaluating such logic.

The techniques described above and below may be implemented in a number of ways and in a number of contexts. Several example implementations and contexts are provided with reference to the following figures, as described below in more detail. However, the following implementations and contexts are but a few of many.

Moving on to FIG. 1 which illustrates a flow 100 for diagram for utilizing an interpreter to evaluate logic at run time of a software program, in accordance with at least one embodiment. The flow 100 may begin at 102, where a set of rules (e.g., rule(s) 104) and conditions (e.g., condition(s) 106) are defined. In some embodiments, the set of rules and/or the set of conditions may be expressed in a domain specific language. A set of rules and conditions may be expressed, that when evaluated by an interpreter, determine a particular color in which a graphical element (e.g., a button) is to be presented at a user interface. Previously, such logic (e.g., the first two lines of domain logic 120) may reside in program code 120. In some embodiments, this domain logic (e.g., the conditions/reasons why a particular set of operations are performed such as setting the button color to "red") is compiled and executed as part of program code 120. Instead, these conditions can be extracted and encapsulated in interpretable code which is evaluated by an interpreter. Thus, the domain logic can be replaced with an invocation of the interpreter as depicted in the first line of program code 122 and the graphical element may be set to whatever value is returned by the interpreter.

For example, at 108, program code 122 may be executed that includes an invocation of an interpreter (e.g., interpreter 110, an interpreter that is configured for a specific domain). The interpreter 110 may be configured to execute on computing device 112 (e.g., a user device operated by user 114). The interpreter 110 may be configured to accept contextual data 116, rule(s) 104, and condition(s) 105 as input. The contextual data 116 may be obtained by the computing device 112 (e.g., via an application operating at the computing device 112, such as a web browser or a shopping application, etc.). The contextual data 116 may include any suitable number of parameters specific to the domain and/or the user.

At 118, the contextual data 116 may be provided to the interpreter 110 at run time. The contextual data 116 may be utilized by the interpreter 110 to evaluate a given feature (e.g., to determine a button color) which may correspond to a subset of the condition(s) 106 and rule(s) 104. Prior to run time, program code 120 may be replaced with program code 122 that includes an invocation of the interpreter (e.g., the first line of program code 122). In some embodiments, the rule(s) 104 and condition(s) 106 may be predefined and accessible to the interpreter 110. In other embodiments, the rule(s) 104 (or an identifier for the rule(s) 104) and/or the condition(s) 106 (or an identifier for the condition(s) 106) may be provided as a parameter in the invocation of the interpreter. The invocation may specify a feature to be evaluated (e.g., "DecideBC") and contextual data 116 may be provided to the interpreter 110 as specified by the first line of program code 122.

A web browser 124 operating on computing device 112 may obtain contextual data 116. Contextual data 116 may identify, among other things, a particular domain (e.g., domain A). At run time, the web browser 124 may load a web page (e.g., defined in HTML, text). Some aspects of the web page may depend on the contextual data 116. For example, a button in one domain (e.g., domain A) is to be rendered in one color (e.g., red), while the same button is to be rendered in a different color (e.g., blue) when rendered for a different domain (e.g., domain B). The web browser 124 may execute the invocation of interpreter 110 (e.g., included in program code 122) which passes at least the contextual data 116 to the interpreter 110. The interpreter 110 then evaluates one or more of the condition(s) 106 using at least one of the rule(s) 104 and in light of the contextual data 116. The interpreter may then provide a return value to the web browser (e.g., ReturnedBC) that identifies a color in which the button is to be rendered.

At 126, one or more operations may be performed based at least in part on output provided by the interpreter. For example, the return value provided by the interpreter 110 may be used by the web browser 124 to render the given button in the color identified by the return value.

Although this example utilizes the context of rendering an interface element such as a button by a web browser, it should be appreciated that any suitable domain logic in any suitable context may be similarly provided. By replacing domain logic in program code with invocations of a locally executing interpreter (e.g., the interpreter 110 executing on the computing device 112), the rendering of the exemplary button may be performed faster than if the program code was used to make such determination. This is especially true when the logic includes server calls which generally require more processing time than operations executed locally at a device due to the inherent network latencies in such calls. Thus, the speed of evaluating domain logic may be increased through the utilization of the disclosed techniques. In the example at hand, utilizing the program code 122 to invoke the interpreter 110 rather than executing program code 120 causes the webpage to be loaded faster.

FIG. 2 illustrates a number of example code segments 200 utilized to express domain logic, in accordance with at least one embodiment. As a non-limiting example, code segments 202 and 204 may express the same logic using two different programming languages. By way of example, code segment 202 expresses logic in a first programming language, while code segment 204 expresses the same logic in a second programming language that is different from the first programming language. In some embodiments, the code segment 202 may be utilized by one platform and the code segment 206 may be utilized by a different platform.

As an example, the logic may specify that when contextual data includes a countryCode parameter that is equal to "US" and a pageType that is equal to "detail", a value of "Blue" is returned (the value being subsequently used to identify a color of a button on a user interface). The logic may further specify that if the first condition is not met, a second condition may be evaluated. The second condition may specify that when the countryCode parameter is equal to "CN" and the pageType is "detail", the value of "Red" is returned. The logic may also specify that if neither the first condition, nor the second condition is met, the value of "Green" is returned. It should be appreciated that a string is used as a return value in the ongoing example, however, a return value may correspond to any suitable primitive data type (e.g., integer, Boolean, string, character, double, etc.) and/or any suitable complex data type (e.g., Array, List, Map, Struct, etc.).

Code segment 206 may express the same logic as code segments 202 and 204. By way of example, statements 208 of code segment 206 may correspond to statements 210 and 212 of code segments 202 and 204, respectively. Likewise, statements 208 of code segment 206 may correspond to statements 210 and 212 of code segments 202 and 204, respectively. Statement 220 may correspond to statement 222 and statements 224 of code segments 202 and 204, respectively. Code segment 206 may express logic in a domain specific language. The domain specific language, and thus, the logic provided by the code segment 206 may be interpretable by a variety of interpreters of different domains and/or platforms. When a change is needed in the logic, the change need only be implemented in the code segment 206. This improves the change process by enabling the change to be made at a central location rather than individual changes to be made within individual code segments of each domain (e.g., code segments 202 and 204).

Figure 3:
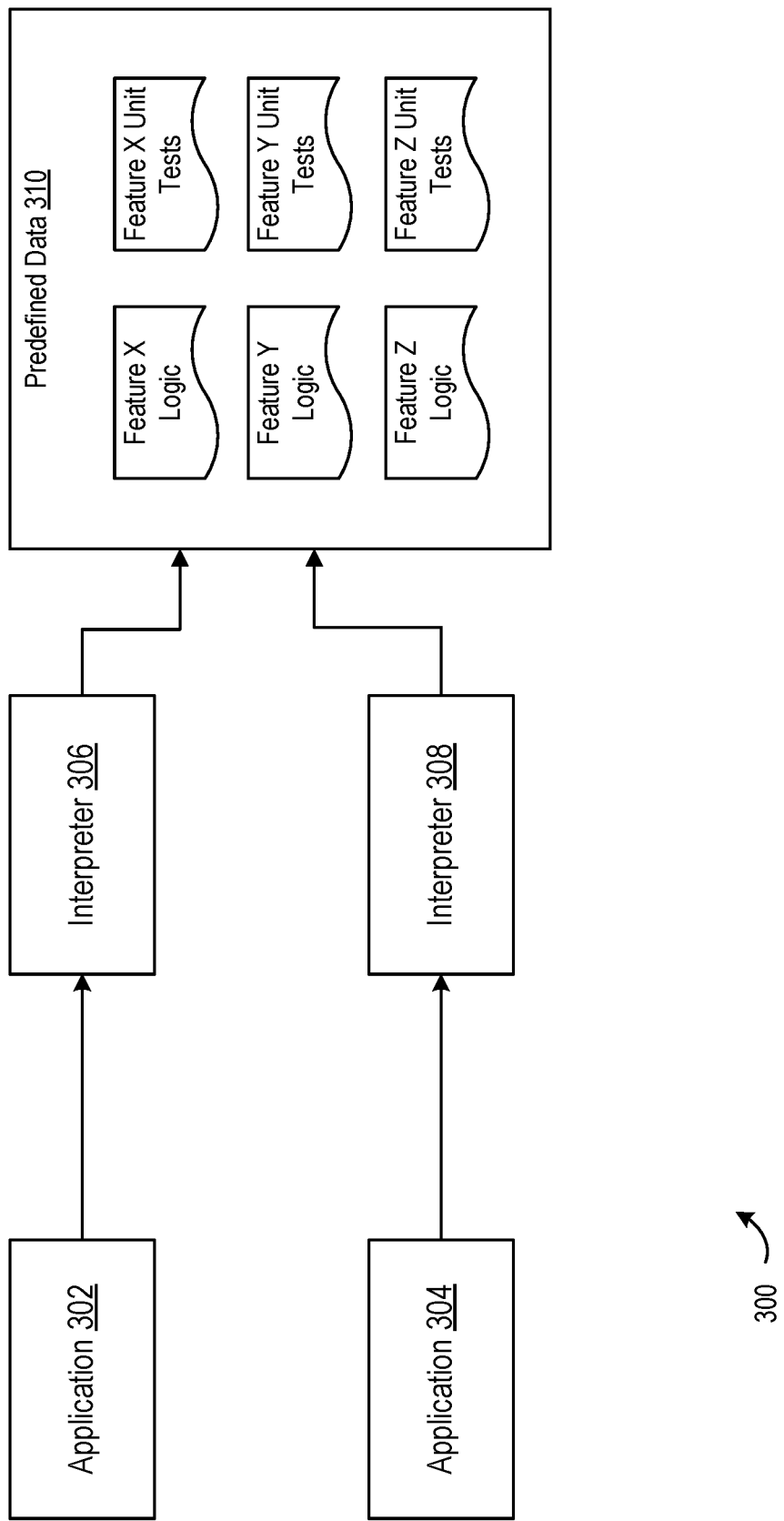
FIG. 3 is a block diagram illustrating an environment including a number of interpreters specific to different domains, in accordance with at least one embodiment.

FIG. 3 is a block diagram illustrating an environment 300 including a number of interpreters specific to different domains, in accordance with at least one embodiment. Applications 302 and 304 may individually be any suitable application (e.g., a web browser such as the web browser 124 of FIG. 1, a shopping application, or the like) that is specific to a particular domain. By way of example, application 302 may correspond to domain A (e.g., an online retail website associated with country A) and application 304 may correspond to domain B (e.g., an online retail website associated with country B). Both applications 302 and 304 may be configured to execute code that invokes a corresponding interpreter. By way of example, application 302 may be configured to invoke interpreter 306 and application 304 may be configured to invoke interpreter 308. Each interpreter may be configured to evaluate one or more features (e.g., feature X, feature Y, feature Z, etc.) using predefined rules and conditions provided in the predefined data 310. The interpreters 306 and 308 may be configured to perform unit tests of one or more features utilizing predefined unit tests of the predefined data 310 (e.g., feature X unit test corresponding to a unit test of feature X, feature Y unit test corresponding to a unit test of feature Y, feature Z unit test corresponding to a unit test of feature Z, etc.). While a particular number of applications, interpreters, and features are illustrated in FIG. 3, the number of such components is utilized for illustrative purposes only and is not intended to limited the scope of disclosure. Thus, any suitable number of such components may be similarly utilized in accordance with one or more embodiments.

Figure 4:
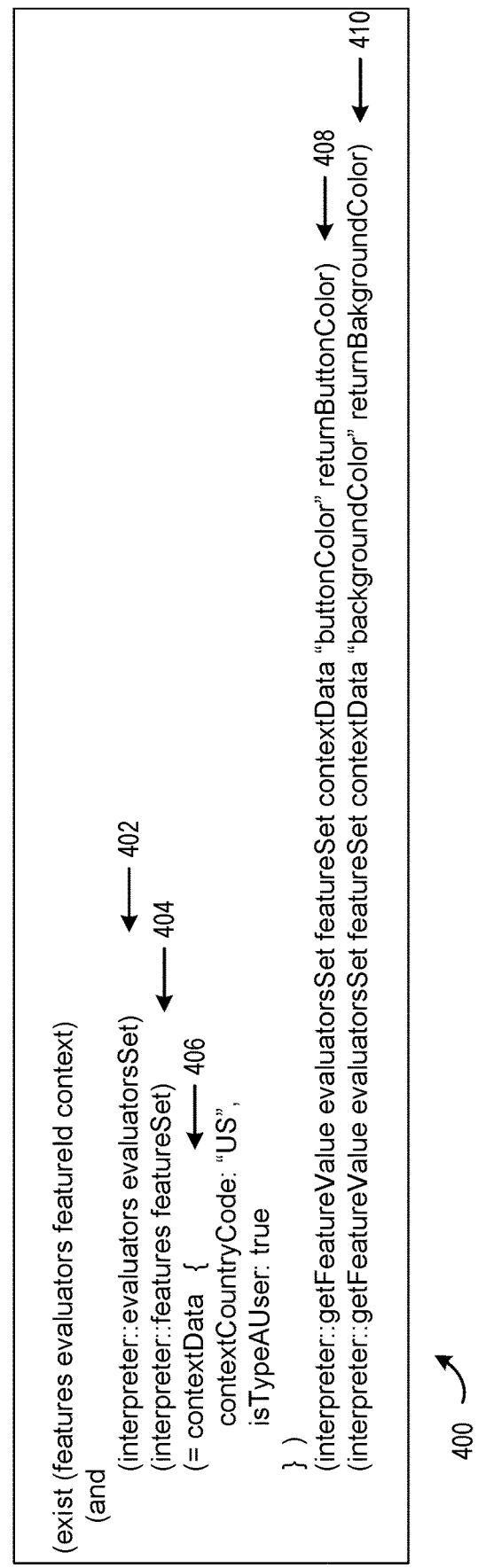
FIG. 4 illustrates an example code segment that includes an invocation of a domain-specific interpreter, in accordance with at least one embodiment.

FIG. 4 illustrates an example code segment 400 that includes an invocation of a domain-specific interpreter (e.g., the interpreter 306 of FIG. 3, corresponding to domain A), in accordance with at least one embodiment. As a non-limiting example, the code segment 400 is expressed in one programming language, but the code segment 400 could be expressed in any suitable programming language corresponding to the particular domain within which the interpreter is invoked (e.g., Java, JavaScript, C++, Python, etc.). At 402, a set of evaluators (e.g., predefined evaluators) is generated and a reference (e.g., "evaluatorsSet") is assigned to the set. This is merely one statement that can be used to generate, instantiate, create, or otherwise provide an instance of and reference to a set of evaluators. It should be appreciated that the particular statement used may vary depending on the programming language corresponding to the domain within which the interpreter is invoked.

FIG. 5 illustrates an exemplary set of evaluators 500, in accordance with at least one embodiment. The set of evaluators 500 may be expressed in a domain specific language. In some embodiments, the domain specific language discussed in the examples herein may be configured to be interpretable by any of the interpreters discussed herein. In some embodiments, the domain specific language may be used to define one or more attributes of each evaluator using an identifier for the attribute (e.g., an attribute identifier) and one or more corresponding values. As depicted in FIG. 5, the set of evaluators may be associated with an set identifier (e.g., "evaluatorsSet") and provided within a struct (e.g., a data structure for grouping a list of variables under one name in a block of memory, allowing the different variables to be accessed via a single pointer or by the struct declared name which returns the same address). Although a struct is used in this example, other containers may be employed such as an array, a linked list, a map, or the like.

As provided in FIG. 5, the set of evaluators may include four evaluators (evaluators corresponding to the evaluator definitions 502-508). Each evaluator may include any suitable combination of attributes such as, but not limited to, any suitable combination of an identifier attribute, an implementation attribute, and a context key attribute. By way of example, the identifier attribute of evaluator definition 502 (e.g., evaluator_name) may correspond with a value (e.g., an evaluator identifier such as "countryCode") that provides an identifier with which a particular evaluator may be referred. Evaluator definition 502 may further include an implementation attribute (e.g., evaluator_implementation) that may be associated with a value (e.g., a rule identifier such as "interpreter.evaluators.caseInsensitiveStringEqualEvaluator") that identifies a predefined rule. In some embodiments, one predefined rule (corresponding to one evaluator) may be configured to evaluate whether two input strings are equal to one another. This rule may return a value of "true" when the two input strings are determined to be equal, and "false" when the two input strings are determined to be different. The rule may be associated with an identifier (e.g., "interpreter.evaluators.caseInsensitiveStringEqualEvaluator"). In this manner, the implementation attribute of an evaluator may map the name attribute to the rule identifier. Evaluator definition 502 further includes a context key attribute (e.g., evaluator_uses_context_key) that may correspond with a value (e.g., a field identifier such as "contextCountryCode") that identifies one or more contextual data fields with which is to be utilized by the rule. In this manner, each of the evaluator definitions 502-508 may provide a mapping between an evaluator identifier and a rule identifier. Evaluator definitions 502, 503, and 508 may further map an evaluator identifier and rule identifier to a corresponding set of one or more field identifiers to be utilized by the rule to perform the evaluation.

Returning to FIG. 4, a set of features (e.g., predefined features) is generated and a reference (e.g., "featureSet") is assigned to the set at 404. This is merely one statement that can be used to generate, instantiate, create, or otherwise provide an instance of and reference to a set of features. It should be appreciated that the particular statement used may vary depending on the programming language corresponding to the domain within which the interpreter is invoked.

Figure 6:
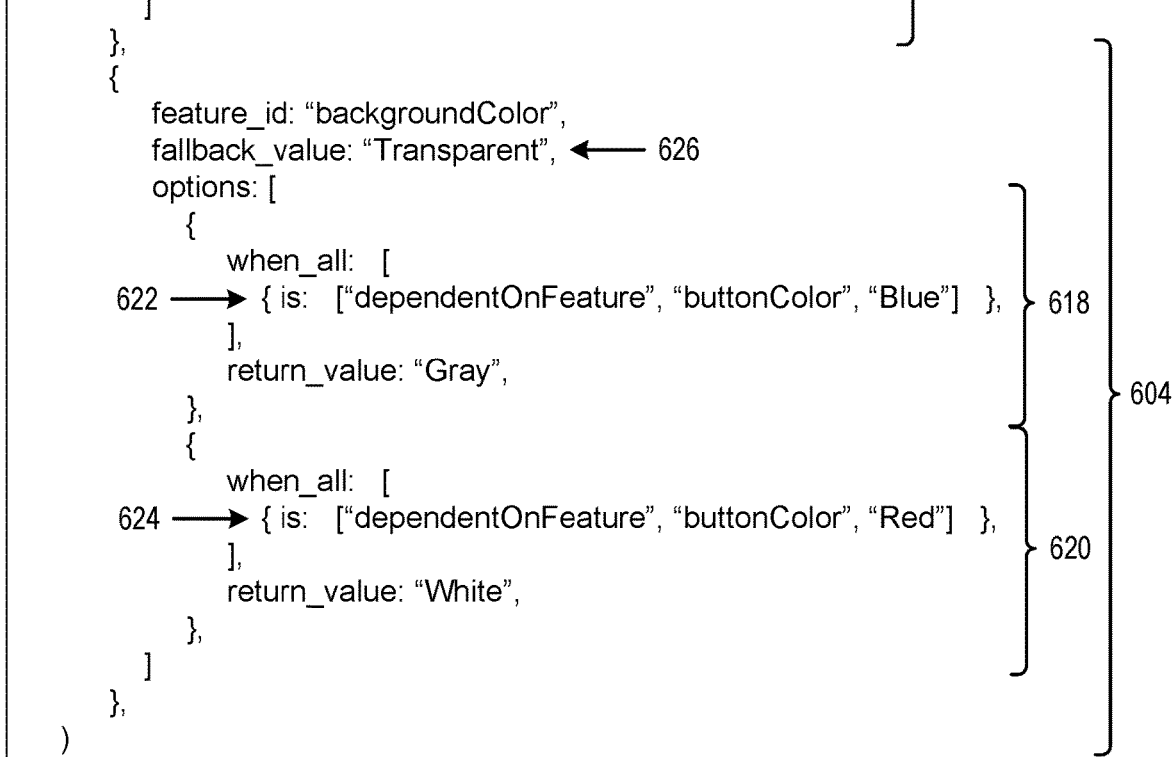
FIG. 6 illustrates an exemplary set of features, in accordance with at least one embodiment.

FIG. 6 illustrates an exemplary set of features 600, in accordance with at least one embodiment. The set of features 600 may be expressed in a domain specific language (e.g., the same domain specific language used to express the set of evaluators 500 of FIG. 5 and/or the code segment 400 of FIG. 4). As discussed above, the domain specific language may be configured to be interpretable by any of the interpreters discussed herein. That is, each interpreter discussed herein may be configured to parse and execute statements of the domain specific language directly, at run time, without first having to compile the statements into a machine language program. In some embodiments, the domain specific language may be used to define one or more attributes of each feature using an identifier for the attribute (e.g., an attribute identifier) and one or more corresponding values. As depicted in FIG. 6, each feature may be associated with one or more attributes and provided within a struct (e.g., a data structure for grouping a list of attributes/variables under one name in a block of memory, allowing the different attributes/variables to be accessed via a single pointer or by the struct declared name which returns the same address). Although a struct is used in this example, other containers may be employed such as an array, a linked list, a map, or the like. In the example provided, the set of features may be accessed using the feature identifier "featureSet".

As provided in FIG. 6, the set of features may include two features (features corresponding to the feature definitions 602 and 604). Each feature may include any suitable combination of attributes such as, but not limited to, any suitable combination of an identifier attribute, a fallback attribute, and set of one or more options. Each option may correspond to a set of one or more conditions and a corresponding return value. Each option may be utilized to define a conditional statement that is predicated on one or more conditions which, if met, are to result in providing as output the return value associated with the option. In some embodiments, one or more of the conditions may identify a particular evaluator and cause the corresponding rule to be evaluated with the data provided.

By way of example, feature definition 602 may include a feature identifier (e.g., feature_id) that is assigned a corresponding value (e.g., "buttonColor") that provides an identifier with which the feature may be referred. The feature definition 602 may include a fallback attribute (e.g., fallback_value) that is assigned a corresponding value (e.g., "Orange"). The fallback value may define a value that is returned if none of the conditions corresponding with the set of options are met. The feature definition 602 may include a set of one or more options that, in some embodiments, may be provided in another struct (or another suitable container). As depicted in FIG. 6, the set of options may include option 606 and option 608. Option 606 may define one or more conditions, that if all are met (as indicated by "when all"), a corresponding return value (e.g., "Blue") is to be provided as output. Option 608 may define one or more conditions, that if all are met (as indicated by "when all"), a corresponding return value (e.g., "Red") is to be provided as output.

As a non-limiting example, option 606 may include two conditions. The first condition of option 606 (e.g., condition 610) may be utilized to identify a particular evaluator (e.g., the evaluator corresponding to the identifier "countryCode", corresponding to evaluator definition 502 of FIG. 5) and a value (e.g., "US") with which the rule is to be evaluated. The identifier "countryCode", as provided in the ongoing example of FIGS. 4-6 may correspond to a rule that evaluates whether one string (e.g., a string provided in a contextual data field "contextCountryCode" as identified in evaluator definition 502) is equal to another string (e.g., the string "US") as provided in condition 610. In this manner, the condition 610 may be utilized to determine whether the string associated with the "contextCountryCode" data field of the contextual data provided is equal to the string "US".

The second condition of option 606 (e.g., condition 612) may be utilized to identify a different evaluator (e.g., the evaluator corresponding to the identifier "isTypeAUser", corresponding to evaluator definition 504 of FIG. 5) based at least in part on the inclusion of the string "isTypeAUser" (e.g., the identifier associated with the evaluator definition 504). In some embodiments, the rule associated with evaluator definition 504 (e.g., "interpreter.evaluators.equalEvaluator") may be configured to identify if one or more contextual data fields (e.g., a contextual data field identified by "typeUser" as defined in evaluator definition 504) is/are associated with a particular value (e.g., Boolean true). The condition 612 may thus be utilized to determine whether the "typeUser" data field of the contextual data provided is equal to the value "true." If both conditions 610 and 612 are met, the return value of "Red" is to be provided as output.

In some embodiments, the conditions 610 and 612 may be evaluated/executed in the order defined in the feature definition 602 (e.g., condition 610 may be evaluated before condition 612). In some embodiments, the order of the conditions can define a priority of the conditions with conditions that occur earlier having a higher priority than those occurring later (e.g., condition 610 having a higher priority than condition 612). In some embodiments, if any condition fails, the interpreter may be configured to forgo evaluating the remaining conditions. By way of example, if the interpreter identifies that the condition 610 has not been met (e.g., the contextCountryCode of the contextual data is determined to be different from the string "US"), the interpreter may forgo evaluating the condition 612. This can provide a performance enhancement in that unnecessary processing may be avoided by forgoing the evaluations of conditions that cannot change the determination of whether the set of conditions has been met. For example, if the contextCountryCode is not "US", there is no situation in which the return value of "Blue" will be returned, regardless of whether or not the user is a type A user. Thus, the interpreter may skip evaluating the user type altogether to conserve processing resources. Additionally, conditions may be ordered based at least in part on how computationally expensive they are. By way of example, a condition that requires a server call may be positioned last in the set of conditions due to the processing resources required to evaluate that condition being greater than the processing resources needed to evaluate the other conditions. By enforcing that conditions are evaluated in the order in which they are defined, unnecessary and potentially costly processing may be avoided.

Option 608 may also include two conditions, although any suitable number of conditions may be utilized. The first condition of option 608 (e.g., condition 614) may be utilized once again identify the evaluator corresponding to the identifier "countryCode" (e.g., the evaluator corresponding to evaluator definition 502 of FIG. 5) and two values (e.g., "CN" and "CA") with which the rule is to be evaluated. The identifier "countryCode", as provided in the ongoing example of FIGS. 4-6 may be mapped by evaluator definition 502 to be associated with a rule that evaluates whether one string (e.g., a string provided in a contextual data field "contextCountryCode" as identified in evaluator definition 502) is equal to the string provided (e.g., string "CN" and string "CA") as provided in condition 614. In this manner, the condition 614 may be utilized to determine whether the string associated with the "contextCountryCode" data field of the contextual data provided is equal to the string "CN" or the string "CA".

The second condition of option 608 (e.g., condition 616) may be utilized to identify the evaluator corresponding to the identifier "isTypeAUser" (e.g., an evaluator corresponding to evaluator definition 504 of FIG. 5) based at least in part on the inclusion of the string "isTypeAUser" (e.g., the identifier associated with the evaluator definition 504). As described above, the rule associated with evaluator definition 504 (e.g., "interpreter.evaluators.equalEvaluator") may be configured to identify if one or more contextual data fields (e.g., a contextual data field identified by "typeUser" as defined in evaluator definition 504) is/are associated with a particular value (e.g., Boolean true). The condition 612 may thus be utilized to determine whether the "typeUser" data field of the contextual data provided is equal to the value "true." If both conditions 616 and 618 are met, the return value of "Red" is to be provided as output. Option 608 may use the "when_any" condition which indicates the return value of "red" is to be returned if any of the conditions 616 or 618 are met.

If none of the conditions corresponding to options 606 and 608 are met, the fallback value "Orange" is to be provided as output as identified at 617.

The feature set depicted in FIG. 6 may include a second feature (e.g., feature 604). Feature 604 (and in some embodiments, all features of the feature set) may include a feature identifier (e.g., feature_id) that is assigned a corresponding value (e.g., "backgroundColor") that provides an identifier with which the feature 604 may be referred. The feature 604 may include a fallback attribute (e.g., fallback_value) that is assigned a corresponding value (e.g., "Transparent"). The fallback value may define a value that is returned if none of the conditions corresponding with the set of options are met. The feature 604 may include a set of one or more options that, in some embodiments, may be provided in another struct (or another suitable container). As depicted in FIG. 6, the set of options may include option 618 and option 620.

Option 618 may include one condition (e.g., condition 622), although any suitable number of conditions may be utilized. Condition 622 may be utilized to identify the evaluator corresponding to the identifier "dependentOnFeature" (e.g., an evaluator corresponding to evaluator definition 506 of FIG. 5) based at least in part on the inclusion of the string "dependentOnFeature" (e.g., the identifier associated with the evaluator definition 506). As described above, the rule associated with evaluator definition 506 (e.g., "interpreter.evaluators.dependentOnFeatureEvaluator") may be configured to identify if a feature (e.g., feature definition 602, as identified by the identifier "buttonColor"), when evaluated, selected a particular return value (e.g., "Blue") to be provided as output. That is, the condition 622 may identify that when "Blue" is selected as the return value for the buttonColor feature, the return value of "Gray" is to be provided for the feature "backgroundColor". Similarly, condition 624 may identify that when "Red" is selected as the return value for the buttonColor feature, the return value of "White" is to be provided for the feature "backgroundColor". If neither condition is met, the return value of "Transparent" is to be provided as output as identified by the corresponding fallback value identified at 626.

Returning to FIG. 4, where contextual data can be defined at 406. Although the example depicted indicates manual assignment of a number of contextual data fields (e.g., contextCountryCode and isTypeAUser), it should be appreciated that contextual data may be obtained through other means (e.g., via a function call that returns contextual data associated with the environment and/or user). Contextual data may include any suitable number of data fields and may represent a super set of data fields needed to evaluate any of the evaluators defined in the set of evaluators depicted in FIG. 5. For example, contextual data may include any suitable combination of: an environment identifier, a realm, a session identifier associated with a browsing session, a domain identifier, an indicator identifying the user as a particular type of customer, a country identifier associated with the domain, a page type associated with the web page to be rendered (e.g., a web page to be rendered by the web browser 124 of FIG. 1), and the like. The particular number and makeup of the data fields of the contextual data may vary depending on the context in which this data is used.

At 408, a first invocation of the interpreter may be executed. In this invocation, the identifier for the evaluator set (e.g., "evaluatorsSet" corresponding to the identifier associated with the set of evaluators of FIG. 5) is provided to the interpreter invoked at 408. In some embodiments, the invocation at 408 may further include an identifier for the feature set (e.g., "featureSet" corresponding to the identifier associated with the set of features of FIG. 6). In some embodiments, the invocation at 408 may include an identifier associated with a particular instance of contextual data (e.g., the contextual data defined at 406 and including data fields "contextCountryCode" and "isTyoeAUser" and their corresponding values). The invocation at 408 may include an identifier for the feature to be evaluated (e.g., "buttonColor" corresponding to the identifier associated with feature 602 of FIG. 6). The invocation at 408 may include an identifier (e.g., returnButtonColor) which may be a variable of the same name that may be used to store the return value provided as output through the evaluation of the identified feature. Thus, the invocation at 408 may cause the interpreter (e.g., the interpreter 110 of FIG. 1) to identify feature definition 602 from the set of features associated with the identifier "featureSet". Upon parsing and evaluating the statements within feature definition 602, one or more evaluators (e.g., one or more evaluators of the set of evaluators associated with the identifier "evaluatorsSet") may be executed as described above in connection with FIG. 6 to identify a particular return value using the data fields defined in the contextData struct at 406. The return value from this evaluation may be stored in a variable associated with the identifier "returnButtonColor". If such a variable does not yet exist, one may be created.

At 410, a second invocation of the interpreter may be executed. In this invocation, as in the invocation at 408, a set of evaluators, the set of features and contextual data may be provided as described above. The invocation at 410 may include an identifier for the feature to be evaluated (e.g., "backgroundColor" corresponding to the identifier associated with feature 604 of FIG. 6). The invocation at 410 may include an identifier (e.g., returnBackgroundColor) which may be a variable of the same name that may be used to store the return value provided as output through the evaluation of the identified feature. Thus, the invocation at 410 may cause the interpreter (e.g., the interpreter 110 of FIG. 1) to identify feature 604 from the set of features associated with the identifier "featureSet". Upon parsing and evaluating the statements within feature 604, one or more evaluators (e.g., one or more evaluators of the set of evaluators associated with the identifier "evaluatorsSet") may be executed as described above in connection with FIG. 6 to identify a particular return value given the data fields of the contextData struct defined at 406. The return value from this evaluation may be stored in a variable associated with the identifier "returnBackgroundColor". If such a variable does not yet exist, one may be created.

Any suitable number of invocations of the interpreter may be utilized to evaluate any suitable number of features using any suitable number of evaluators. In some embodiments, the functionality of the evaluations described above may be invoked through the use of invoking particular functionality associated with a particular function and/or identifier. For example, the invocations at 408 and 410 may identify the "getFeatureValue" functionality of the interpreter which can correspond to the evaluations described above. It should be appreciated that the interpreter may include additional functionality for testing various features and/or evaluators. This functionality may be invoked using a different functionality identifier (e.g., interpreter:featureTester). FIG. 7 describes an example in which this functionality may be utilized.

FIG. 7 illustrates components of an example unit test 700, in accordance with at least one embodiment. The unit test 700 may be defined as a scenario associated with the identifier "scenarios". The set of features and the set of evaluators discussed in connection with FIGS. 4-6 may be accessible to the unit test 700 by using the statement 702. References to the set of features and the set of evaluators may be instantiated at 704 and 706, respectively. The unit test 700, as depicted in FIG. 7, may include four tests (e.g., corresponding to test definitions 708-714), although any suitable number of tests may be defined by the unit test 700. Each test may include a test identifier attribute (e.g., test_name) and a corresponding value (e.g., "Happy Path Button Color US", a test name) that is assigned to that attribute. Each test may include a feature identifier attribute (e.g., feature_id) and a corresponding value (e.g., "buttonColor") that identifies a particular feature to be evaluated. Each test may include an expected value attribute (e.g., expected_value) and a corresponding value (e.g., "Blue") identifying a return value that is expected as output in response to the evaluation of the feature identified by the feature identifier attribute. Each test may include a contextual data container (e.g., a struct "context") that includes one or more context data fields (e.g., contextCountryCode and isTypeAUser). The contextual data container may be utilized to define a particular instance of contextual data to be utilized for the corresponding text.

The test functionality of the interpreter may be invoked at 716. Upon invoking this functionality, the interpreter may be configured to parse each of the tests definitions 708-714 and execute the corresponding operations indicated for each test. By way of example, upon parsing the statements of test 708, the interpreter may evaluate the feature "buttonColor" using the contextual data defined by the context struct defined in test 708. The interpreter may be configured to compare the return value identified from the evaluation to the expected value identified for test 708. If the return value does not match the expected value, the interpreter may be configured to add data indicating the failure to a list (or another suitable container) of failed tests (e.g., identified by the identifier "failedTests" provided within the invocation at 716). In some embodiments, the added data may include any suitable combination of the test identifier, the corresponding feature evaluated, the expected value, the return value obtained through evaluation of the feature, and the contextual data utilized for the evaluation. Thus, a user viewing this information may ascertain which features and/or evaluators may include errors. This can greatly reduce the time needed to identify and correct inadvertent mistakes in the tested logic.

Figure 8:
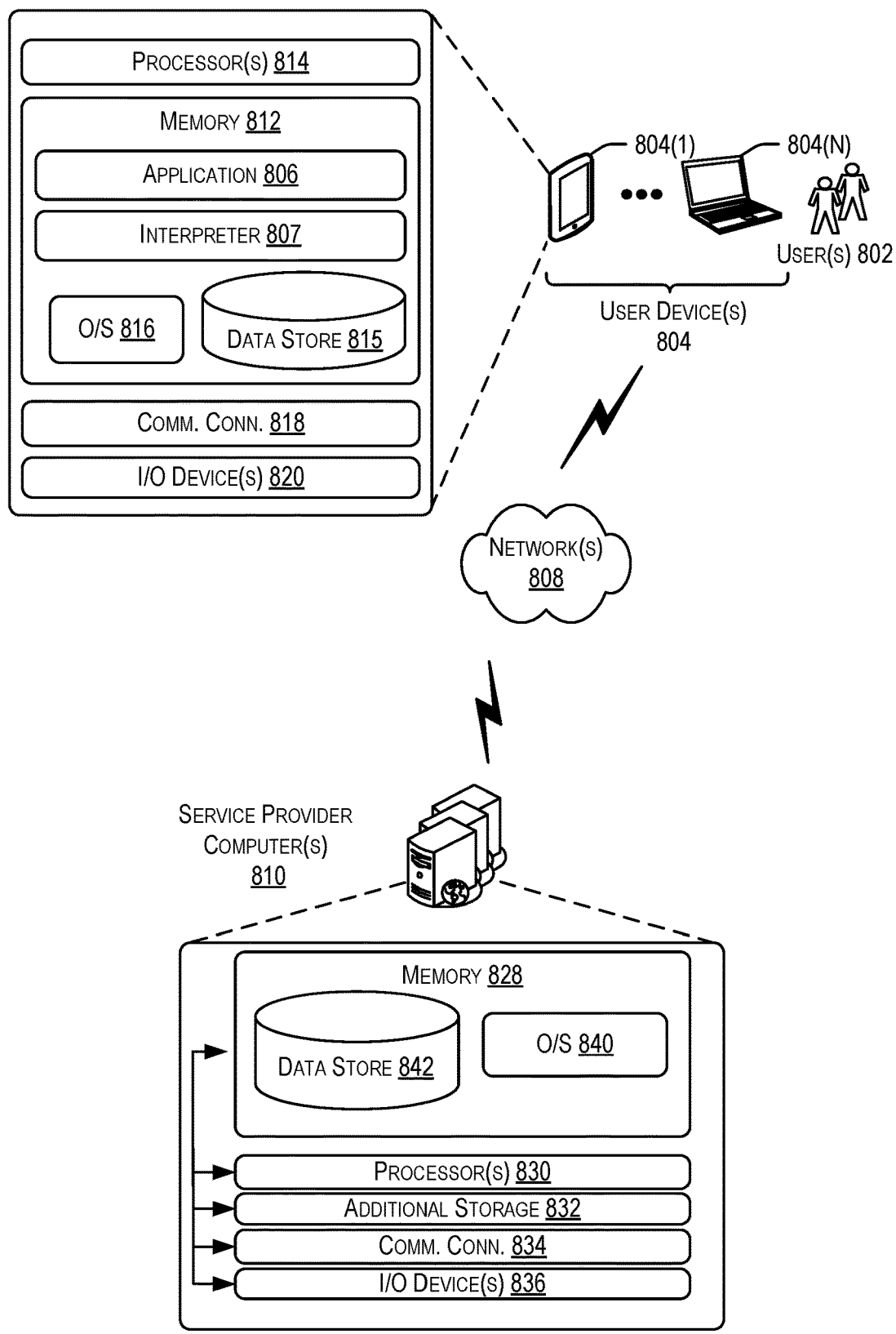
FIG. 8 illustrates components of a system, in accordance with at least one embodiment.

FIG. 8 illustrates components of a system 800 according to a particular embodiment. In system 800, one or more users 802 may utilize a user device (e.g., a user device of a collection of user devices 804(1)-(N) (collectively, user devices 804, each being an example of the computing device 112 of FIG. 1) to navigate to a network page provided by the service provider computer(s) 810 (e.g., computers responsible for hosting web content of a particular domain such as an online retail website corresponding to a particular country and/or region). For example, the user may access a user interface accessible through an application 806 running on the user devices 804 via one or more networks 808. In some aspects, the application 806 operating on the user devices 804 may be hosted, managed, and/or provided by a computing resources service or service provider, such as by utilizing one or more service provider computer(s) 810.

In some examples, the networks 808 may include any one or a combination of many different types of networks, such as cable networks, the Internet, wireless networks, cellular networks, and other private and/or public networks. While the illustrated example represents the users 802 accessing application functionality over the networks 808, the described techniques may equally apply in instances where the users 802 interact with the service provider computer(s) 810 via the one or more user devices 804 over a landline phone, via a kiosk, or in any other suitable manner. It should be appreciated that the described techniques may apply in other client/server arrangements, as well as in non-client/server arrangements (e.g., locally stored applications, etc.).

As described briefly above, the application 806 may allow the users 802 to interact with the service provider computer(s) 810 so as to provide the various functionality described above. For example, a user may utilize the application 806 (e.g., a web browser such as the web browser 124 of FIG. 1, a shopping application, or the like) to browse for various items offered for consumption at an online retail website. In at least one example, the application 806 may provide a network page with which the users 802 may make selections, view their respective shopping carts, purchase, lease, or otherwise obtain access to the item, and the like. The application 806 may be configured to execute functionality according to predefined domain logic. In some embodiments, this domain logic may be embedded in code provided by the service provider computer(s) 810 and executed by the application 806.

The service provider computer(s) 810, perhaps arranged in a cluster of servers or as a server farm, may host the application 806 operating on the user devices 804 and/or cloud-based software services. Other server architectures may also be used to host the application 806 and/or cloud-based software services. The application 806 operating on the user devices 804 may be capable of handling requests from the users 802 and serving, in response, various user interfaces that can be rendered at the user devices 804. The application 806 operating on the user devices 804 can present any suitable type of website that supports user interaction, including search engine sites, item detail pages, shopping cart network pages, and the like. The described techniques can similarly be implemented outside of the application 806, such as with other applications running on the user devices 804.

The user devices 804 may include an interpreter 807 that may be operated as part of the application 806 and/or invoked by the application 806. The interpreter 807 may be configured to parse and execute operations defined in a domain specific language as described in the examples provided above in connection with FIGS. 4-7. The interpreter 807 may be configured to evaluate logic associated with one or more predefined features and/or evaluators.

The user devices 804 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user devices 804 may be in communication with the service provider computer(s) 810 via the networks 808, or via other network connections.

In one illustrative configuration, the user devices 804 may include at least one memory 812 and one or more processing units (e.g., processor(s) 814). The processor(s) 814 may be implemented as appropriate in hardware, computer-executable instructions, firmware, or combinations thereof. Computer-executable instruction or firmware implementations of the processor(s) 814 may include computer-executable or machine-executable instructions written in any suitable programming language to perform the various functions described.

The memory 812 may store program instructions that are loadable and executable on the processor(s) 814, as well as data generated during the execution of these programs. Depending on the configuration and type of user computing device, the memory 812 may be volatile (such as random access memory (RAM)) and/or non-volatile (such as read-only memory (ROM), flash memory, etc.). The user devices 804 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 812 may include multiple different types of memory, such as static random access memory (SRAM), dynamic random access memory (DRAM), or ROM.

Turning to the contents of the memory 812 in more detail, the memory 812 may include an operating system 816, one or more data stores 815, and one or more application programs, modules, or services for implementing the features of the fluid endcap engine 102 disclosed herein, provided via the application 806 (e.g., a browser application, an electronic marketplace shopping application, etc.). The application 806 may be configured to receive, store, and/or display a network page or other interface for interacting with the service provider computer(s) 810. Additionally, the memory 812 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user devices 804 may also contain communications connection(s) 818 that allow the user devices 804 to communicate with a stored database, another computing device or server (e.g., the service provider computer(s) 810), user terminals and/or other devices on the networks 808. The user devices 804 may also include I/O device(s) 820, such as a keyboard, a mouse, a pen, a voice input device, a touch input device, a display, speakers, a printer, etc.

In some aspects, the service provider computer(s) 810 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 810 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 810 may be in communication with the user devices 804 and/or other service providers via the networks 808 or via other network connections. The service provider computer(s) 810 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 810 may include at least one memory 828 and one or more processing units (e.g., processor(s) 830). The processor(s) 830 may be implemented as appropriate in hardware, computer-executable instructions, firmware, or combinations thereof. Computer-executable instruction or firmware implementations of the processor(s) 830 may include computer-executable or machine-executable instructions written in any suitable programming language to perform the various functions described.

The memory 828 may store program instructions that are loadable and executable on the processor(s) 830, as well as data generated during the execution of these programs. Depending on the configuration and type of service provider computer(s) 810, the memory 828 may be volatile (such as RAM) and/or non-volatile (such as ROM, flash memory, etc.). The service provider computer(s) 810 or servers may also include additional storage 832, which may include removable storage and/or non-removable storage. The additional storage 832 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 828 may include multiple different types of memory, such as SRAM, DRAM, or ROM.

The memory 828, the additional storage 832, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 828 and the additional storage 832 are all examples of computer storage media. Additional types of computer storage media that may be present in the service provider computer(s) 810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 810. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 810 may also contain communications connection(s) 834 that allow the service provider computer(s) 810 to communicate with a stored database, another computing device or server, user terminals and/or other devices on the networks 808. The service provider computer(s) 810 may also include I/O device(s) 836, such as a keyboard, a mouse, a pen, a voice input device, a touch input device, a display, speakers, a printer, etc.

Turning to the contents of the memory 828 in more detail, the memory 828 may include an operating system 840, one or more data stores 842, and/or one or more application programs, modules, or services (not depicted) for implementing the features disclosed herein, such as hosting an online retail website.

Figure 9:
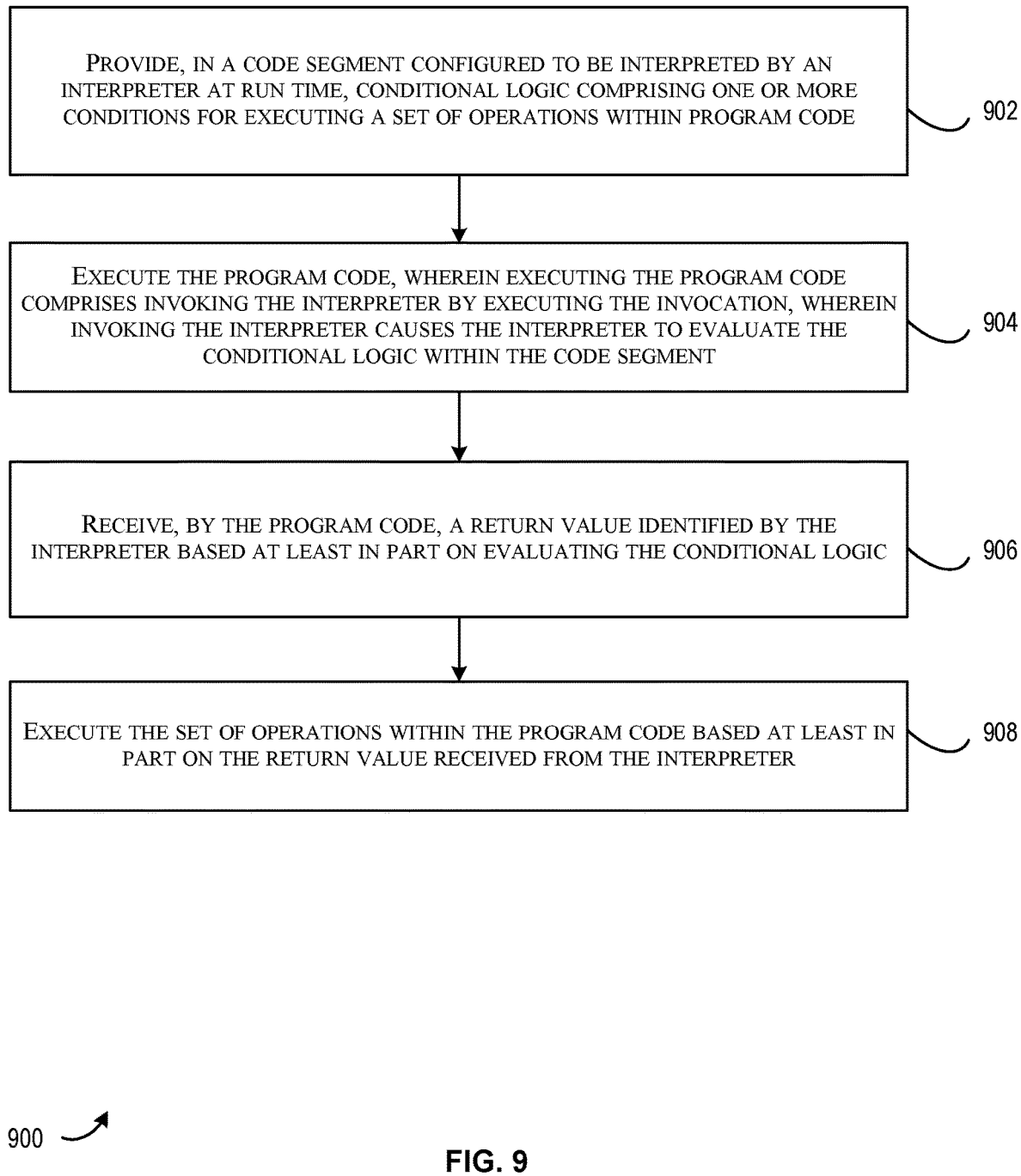
FIG. 9 is a flowchart illustrating an example method for providing item information utilizing the fluid endcap engine, in accordance with at least one embodiment.

FIG. 9 is a flowchart illustrating an example method 900 evaluating logic at run time of a computer program using an interpreter, in accordance with at least one embodiment. The method 900 may be performed by a computing device (e.g., the computing device 112 of FIG. 1). The computing device may include one or more processors, and one or more memories storing computer-executable instructions that, when executed with the one or more processors, cause the computing device to perform the operations of method 900. In some embodiments, the computing device executes an interpreter (e.g., the interpreter 807, which is an example of the interpreter 110 of FIG. 1). The interpreter may be configured to execute the functionality discussed in the above features, to utilize a predefined feature set and a predefined evaluator set evaluate logic (e.g., one or more conditions) at run time.

The method 900 may begin at 902, where conditional logic comprising one or more conditions (e.g., conditions 610 and 612 of FIG. 6) for executing a set of operations in program code (e.g., setting a button to the color "Blue") is provided in a code segment (e.g., features definition 602 of FIG. 6) configured to be interpreted by an interpreter at run time.

At 904, the program code is executed (e.g., by the application 806 of FIG. 8). In some embodiments, executing the program code comprises invoking the interpreter (e.g., the interpreter 807 of FIG. 8) by executing the invocation (e.g., the invocation 408 of FIG. 4). In some embodiments, invoking the interpreter causes the interpreter to evaluate the conditional logic within the code segment.

At 906, a return value is received by the program code (e.g., the application 806). The return value (e.g., "Blue," "Red," "Orange," etc.) is identified by the interpreter based at least in part on evaluating the conditional logic.

At 908, the set of operations within the program code are executed based at least in part on the return received from the interpreter. By way of example, a graphical element such as a button can be presented in a particular color as identified by the return value provided by the interpreter.

Figure 10:
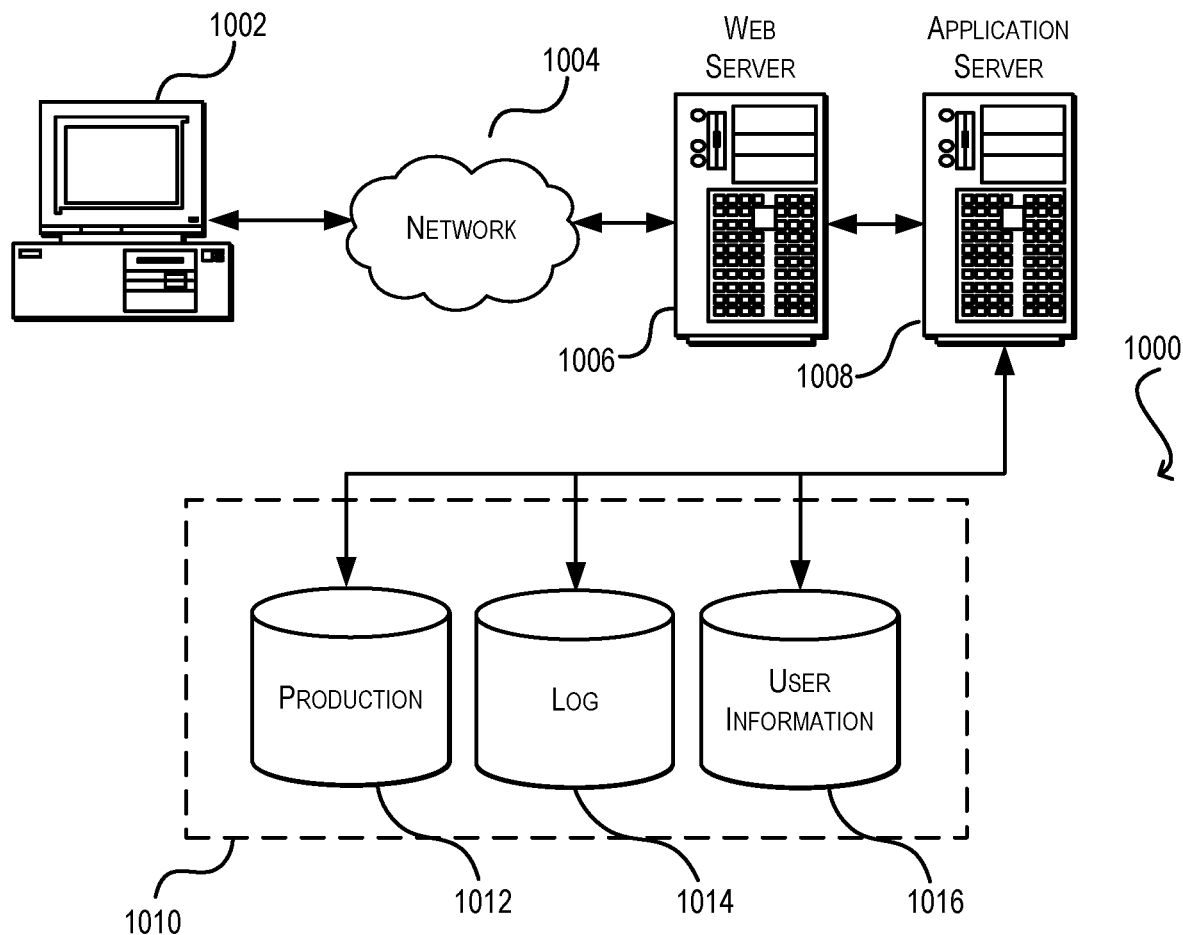
FIG. 10 is a schematic diagram illustrating an example environment for implementing aspects of the invention in accordance with at least one embodiment described herein.

FIG. 10 illustrates aspects of an example system 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010 or filesystem (not depicted). It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the electronic client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for evaluating conditional logic using an interpreter at run time, the interpreter being configured to directly execute source code, the method comprising:

obtaining an evaluator definition comprising a mapping of an evaluator identifier to a rule and one or more contextual data fields with which the rule is to be executed;

obtaining a feature definition comprising the conditional logic, the conditional logic being configured to execute the evaluator when evaluated by the interpreter at runtime, the conditional logic comprising one or more conditions for executing a set of operations for identifying an attribute for a graphical interface element;

obtaining executable program code, the executable program code being generated from program code based at least in part on compiling the program code using a compiler;

executing the executable program code;

during execution of the executable program code, obtaining contextual data corresponding to a run time environment;

invoking the interpreter based at least in part on executing an operation of the executable program code, wherein invoking the interpreter comprises providing the interpreter the contextual data and respective identifiers identifying the evaluator definition and the feature definition, causing the interpreter to evaluate the conditional logic with the contextual data corresponding to the run time environment;

receiving, during the execution of the executable program code, a return value identified by the interpreter based at least in part on evaluating the conditional logic of the feature definition with the contextual data, the return value identifying the attribute for the graphical interface element; and utilizing the return value during the execution of the executable program code causing the graphical interface element to be presented according to the attribute identified by the return value received from the interpreter.

2. The computer-implemented method of claim 1, wherein the contextual data identifies at least one of: a region, a realm, a session identifier, an environment identifier, a type of user, a destination country, a type of webpage, or a webpage identifier for a webpage.

3. The computer-implemented method of claim 1, wherein an invocation is used to invoke the interpreter and the invocation is configured to be embedded within code segments that are written in differing programming languages.

4. The computer-implemented method of claim 1, further comprising:

generating, during the execution of the executable program code, modified conditional logic based at least in part on modifying the conditional logic;

invoking, during the execution of the executable program code, the interpreter, wherein invoking the interpreter comprises providing subsequent contextual data of the run time environment, and wherein invoking the interpreter comprises evaluating the modified conditional logic based at least in part on the subsequent contextual data.

5. A computing device, comprising:

one or more processors; and one or more memories storing computer-executable instructions that, when executed with the one or more processors, cause the computing device to:

obtain an evaluator definition corresponding to an evaluator, the evaluator definition comprising a mapping of an evaluator identifier to a rule and one or more contextual data fields with which the rule is to be executed;

obtain a feature definition comprising conditional logic, the conditional logic being configured to execute the evaluator when evaluated by an interpreter at run time, the conditional logic comprising one or more conditions for executing a set of operations within program code;

obtain executable program code, the executable program code being generated based at least in part on the program code being compiled using a compiler;

execute the executable program code, wherein executing the executable program code comprises invoking the interpreter by executing an invocation that provides the interpreter with contextual data corresponding to a run time environment and respective identifiers identifying the evaluator definition and the feature definition, wherein invoking the interpreter causes the interpreter to evaluate the conditional logic of the feature definition with the contextual data corresponding to the run time environment;

receiving, during execution of the executable program code, a return value identified by the interpreter based at least in part on evaluating the conditional logic with the contextual data corresponding to the run time environment; and executing the set of operations within the executable program code based at least in part on the return value received from the interpreter.

6. The computing device of claim 5, wherein the feature definition corresponds to a feature, the feature definition comprising at least one condition that identifies the evaluator identifier and a corresponding return value that is returned when the at least one condition is met the feature definition further comprising a feature identifier and a feature fallback value.

7. The computing device of claim 6, wherein the evaluator is one of a set of evaluators and the feature is one of a set of features and wherein invoking the interpreter comprises passing the interpreter the set of evaluators, the set of features, the contextual data corresponding to the run time environment, one feature identifier, and one identifier for the return value.

8. The computing device of claim 7, wherein the interpreter evaluates the conditional logic based at least in part on identifying the feature from the set of features using the feature identifier.

9. The computing device of claim 7, wherein the interpreter evaluates the conditional logic based at least in part on executing at least two evaluators of the set of evaluators.

10. The computing device of claim 9, wherein the set of evaluators comprises at least two evaluators, and wherein the at least two evaluators are executed in an order corresponding to the order in which the set of evaluators are defined.

11. The computing device of claim 10, wherein a second evaluator of the at least two evaluators is not executed based at least in part on executing a first evaluator of the at least two evaluators, the first evaluator being defined before the second evaluator in a definition segment that defines the set of evaluators.

12. A non-transitory computer readable storage medium comprising computer-executable instructions that, when executed with one or more processors, cause a computing device to:

obtain an evaluator definition corresponding to an evaluator, the evaluator definition comprising a mapping of an evaluator identifier to a rule and one or more contextual data fields with which the rule is to be executed;

obtain a feature definition comprising conditional logic, the conditional logic being configured to execute the evaluator when evaluated by an interpreter, the conditional logic comprising one or more conditions for executing a set of operations within program code;

obtain executable program code, the executable program code being generated based at least in part on the program code being compiled using a compiler;

invoke the interpreter based at least in part on executing an operation of the executable program code, wherein invoking the interpreter comprises providing, to the interpreter, contextual data corresponding to a run-time environment and respective identifiers identifying the evaluator definition and the feature definition, the interpreter evaluating the conditional logic of the feature definition with the contextual data corresponding to the run-time environment;

receive during execution of the executable program code, a return value identified by the interpreter based at least in part on evaluating the conditional logic with the contextual data corresponding to the run-time environment; and execute the set of operations within the executable program code based at least in part on the return value received from the interpreter.

13. The non-transitory computer readable storage medium of claim 12, wherein the computer-executable instructions that provide the contextual data corresponding to the run-time environment to the interpreter are configured to be executed in a code segment of the executable program code that is written in a first programming language, wherein the interpreter is specific to the first programming language.

14. The non-transitory computer readable storage medium of claim 12, wherein the conditional logic is provided in interpretable code, and wherein the conditional logic is configured to be utilized by interpreters that can be invoked from a plurality of platforms corresponding to a plurality of programming languages.

15. The non-transitory computer readable storage medium of claim 12, wherein the computing device is further caused to:

store first data corresponding to the evaluator, wherein the first data comprises the mapping and wherein the first data defines a set of evaluators comprising the evaluator;

store second data corresponding to a feature, the feature comprising the conditional logic and identifying the evaluator identifier, wherein the second data defines a set of features comprising the feature.

16. The non-transitory computer readable storage medium of claim 15, wherein the first data, the second data, and the contextual data are expressed in a domain specific language associated with the interpreter.

17. The non-transitory computer readable storage medium of claim 15, wherein the conditional logic comprises a first condition and a second condition, the first condition corresponding to the evaluator, the second condition corresponding to a second evaluator, wherein the second condition is not evaluated based at least in part on evaluating the rule associated with the evaluator corresponding to the first condition.

18. The non-transitory computer readable storage medium of claim 17, wherein the first condition is evaluated first based at least in part on an order by which the evaluator and the second evaluator are defined.

* * * * *